United States Patent
Wu et al.

(10) Patent No.: US 10,444,740 B2
(45) Date of Patent: Oct. 15, 2019

(54) PANEL SORTING DEVICE

(71) Applicant: Wuhan China Star Optoelectronics Technology Co., Ltd., Wuhan, Hubei (CN)

(72) Inventors: Peilin Wu, Hubei (CN); Zhiming Li, Hubei (CN); Xiangwei Lou, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 28 days.

(21) Appl. No.: 15/744,820

(22) PCT Filed: Oct. 27, 2017

(86) PCT No.: PCT/CN2017/107951
§ 371 (c)(1),
(2) Date: Jan. 14, 2018

(87) PCT Pub. No.: WO2019/061624
PCT Pub. Date: Apr. 4, 2019

(65) Prior Publication Data
US 2019/0094839 A1     Mar. 28, 2019

(30) Foreign Application Priority Data
Sep. 26, 2017 (CN) .......................... 2017 1 0884997

(51) Int. Cl.
*G06F 7/00*     (2006.01)
*G05B 19/418*     (2006.01)
(Continued)

(52) U.S. Cl.
CPC ............ *G05B 19/4183* (2013.01); *B07C 5/34* (2013.01); *B07C 5/342* (2013.01); *B65G 1/14* (2013.01);
(Continued)

(58) Field of Classification Search
None
See application file for complete search history.

(56) References Cited

U.S. PATENT DOCUMENTS

| | | | | |
|---|---|---|---|---|
| 5,825,500 A | * | 10/1998 | Iino | ......................... G01N 21/88 356/394 |
| 2015/0145541 A1 | * | 5/2015 | Kudo | ..................... G09G 3/006 324/750.19 |

FOREIGN PATENT DOCUMENTS

| CN | 101798727 A | 8/2010 |
|---|---|---|
| CN | 105460476 A | 4/2016 |
| CN | 106583275 A | 4/2017 |

* cited by examiner

*Primary Examiner* — Yolanda R Cumbess
(74) *Attorney, Agent, or Firm* — Hemisphere Law, PLLC; Zhigang Ma

(57) ABSTRACT

Disclosed is a panel sorting device which includes a placement rack, an alignment device, and a classification robotic arm. The placement rack has multiple layers. In each layer of the placement rack, at least one panel is placed according to a predetermined sequence and corresponding position. The alignment device is configured to obtain the positional deviation of the panel moved on a production line. The classification robotic arm is configured to correct the panel position in the placement rack based on the positional deviation acquired by the alignment device, and place the panel in the corresponding layer of the placement rack according to the predetermined sequence and position. The panel sorting device can quickly grab the panel and automatically sort the panels according to the product's speci- (Continued)

fications. As a result, it can increase demand for automated handling and production yield, and reduce costs and save installation space.

15 Claims, 1 Drawing Sheet

(51) Int. Cl.
    *B65G 1/14*           (2006.01)
    *B07C 5/34*           (2006.01)
    *B07C 5/342*          (2006.01)

(52) U.S. Cl.
    CPC .. G05B 19/4189 (2013.01); *B07C 2501/0063* (2013.01); *G05B 2219/40066* (2013.01); *G05B 2219/40078* (2013.01); *G05B 2219/40572* (2013.01); *G05B 2219/40607* (2013.01)

PANEL SORTING DEVICE

RELATED APPLICATIONS

The present application is a National Phase of International Application Number PCT/CN2017/107951, filed Oct. 27, 2017, and claims the priority of China Application No. 201710884997.5, filed Sep. 26, 2017.

FIELD OF THE DISCLOSURE

The disclosure relates to a display panel technical field, and more particularly to a panel sorting device.

BACKGROUND

In the prior art, as the traditional Liquid crystal displays (LCD) factory produce larger size panel products, so easy to automate production. However, in current factory, the productions of these panels usually have smaller size with many kinds of types, and the grades of these productions are more than before. Therefore, the requirements for sorting and transferring efficiency are more important.

The traditional Low Temperature Poly-silicon (LTPS) factory, especially for the production of small-sized panel factory, the back-end of the production line is less automated. This kind of factory still adopts the traditional way of delivering panels. The resulting technical problems include requiring a significant amount of manpower handling, which making the handling of the panels on the back-end of the production line less automated. Moreover, there is a significant increase in manpower costs, and personnel are not safe in handling.

SUMMARY

The efficacy to be achieved by the present invention is to invent a panel sorting device. The panel sorting device can quickly grab the panel and automatically sort according to the product's specifications. The panel sorting device also has the efficiency of automated handling and the yield of the product can be further improved. In addition, the panel sorting device can reduce costs and save installation space.

In order to solve the above technical problems, the embodiments of the present invention provide the panel sorting device. The panel sorting device is configured for sorting and transferring panels. The panel sorting device comprises a placement rack, an alignment device, and a classification robotic arm. The placement rack has multiple layers. In each layer of the placement rack, at least one panel is placed according to a predetermined sequence and corresponding position. The alignment device is configured to obtain the positional deviation of the panel moved on a production line. The classification robotic arm is configured to correct the panel position based on the information of the positional deviation acquired by the alignment device, and places the panel in accordance with its sequence and specification to the corresponding position in the layer of the placement rack. The classification robotic arm then corrects the panel position based on the information of the positional deviation acquired by the alignment device, and places the panel in accordance with its sequence and specification to the corresponding position in the layer of the placement rack.

The alignment device also comprises a photography module, an analysis module, and a data transfer module. The photography module is configured to photograph the panels on the production line in position. The analysis module is configured to analyze the data based on the data taken by the photography module, and obtains the positional deviation of the panel. The data transfer module is configured to transfer the data analyzed by the analysis module to the classification robotic arm. The photography module, the analysis module, and the data transfer module are coupled in sequence.

The panel sorting device further comprises a transfer robotic arm. The transfer robotic arm is configured to remove the panel in accordance with its sequence and specification to the corresponding position in the layer of the placement rack to the corresponding position in a cassette. The transfer robotic arm repeatedly removes the panel in accordance with its sequence and specification to the corresponding position in the layer of the placement rack to the corresponding position in the cassette.

Wherein, the alignment device and the classification robotic arm are respectively set on a classification frame connecting with the production line. The classification frame is a frame structure. The alignment device connects with the classification robotic arm.

Wherein, the placement rack connects with the classification frame.

Wherein, the transfer robotic arm and the cassette are frame structure respectively, and can be overall moved respectively.

Wherein, the transfer robotic arm is disposed between the cassette and the placement rack.

Wherein, the placement rack connects with the classification frame.

Wherein, the transfer robotic arm and the cassette are frame structure respectively, and can be overall moved respectively.

Wherein, the transfer robotic arm is disposed between the cassette and the placement rack.

The implementation of the panel sorting device provided by the invention has the following beneficial effects:

Second, the transfer robotic arm can remove the panel according to a predetermined sequence that corresponds to a position in the layer in the placement rack and the position of the panel in the cassette. Therefore, the efficiency of automated handling and the yield of the product can be further improved.

Third, the sorting device includes a structure that can achieve increased the demand for automated handling that can be easily repaired and maintained. Further the device also reduces costs and saves space.

BRIEF DESCRIPTION OF THE DRAWINGS

In order to more clearly disclose the embodiments or the technical solutions of the present invention, the following drawings, which are to be used in the description of the embodiments or the technical solutions, will be briefly described. The drawings in the description below are merely some embodiments of the disclosure, a person skilled in the art can obtain other drawings according to these drawings without creative efforts.

DETAILED DESCRIPTION OF PREFERRED EMBODIMENTS

The disclosure will be further described in detail with reference to accompanying drawings and preferred embodiments as follows. The specific structural and functional details disclosed herein are only representative and are intended for describing exemplary embodiments of the disclosure. However, the disclosure can be embodied in many forms of substitution, and should not be interpreted as merely limited to the embodiments described herein. All other embodiments obtained by persons of ordinary skill in the art based on the embodiments of the present invention without creative efforts shall fall within the protection scope of the present invention.

Figure 1:
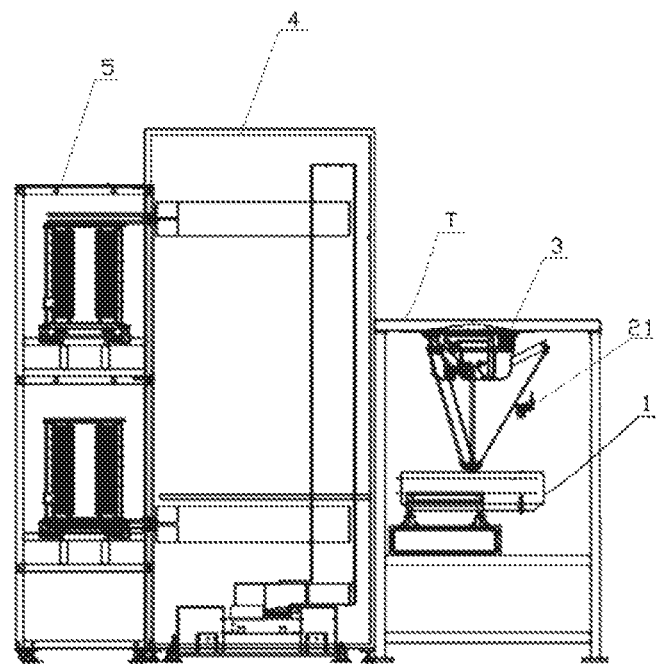
FIG. 1 is a structural schematic view of a panel sorting device according to an embodiment of the disclosure.

As shown in FIG. 1, it is a first embodiment of a panel sorting device according to the present invention.

The panel sorting device in this embodiment comprises a placement rack 1, an alignment device 2, and a classification robotic arm 3. The placement rack 1 has multiple layers. In this embodiment, there are two layers.

In each layer of the placement rack 1, at least one panel is placed according to a predetermined sequence and corresponding position.

The alignment device 2 is configured to obtain the positional deviation of the panel moved on a production line.

The classification robotic arm 3 is configured to correct the panel position in the placement rack based on the positional deviation acquired by the alignment device 2, and place the panel in the corresponding layer of the placement rack 1 according to the panel specification, and predetermined sequence and position.

Causing the classification robotic arm 3 to correct the panel position in the placement rack based on the positional deviation acquired by the alignment device 2, and place the panel in the corresponding layer of the placement rack 1 according to the predetermined and position.

In an embodiment, the placement rack 1 is an open cubic frame structure. In this embodiment, the placement rack 1 has two layers. In other embodiments, the number of layers of the placement rack 1 may be different, for example, three or five layers. In each layer of the placement rack 1, the space for storing the panels has two rows and six columns. Each column stores the same specification of the panel. In the other hand, each layer of the placement rack 1 can store twelve panels with six kinds of specification in this embodiment.

The placement rack 1 uses the front and rear of each row to discharge the same specification of the panels is designed for the following advantages. The placement rack 1 can Increases the loading amounts of these panels. The robotic arm is very handy to grab or place panels such as glass substrates from the top and bottom of the front and rear rows. This can improve handling efficiency.

As still another embodiment of the disclosure, the specifications according to the panel location can be replaced in the placement rack 1. However, the conditions should followed is the placement rack 1 has multiple layers, and each row in each layer placed one panel according to the specification.

Figure 2:
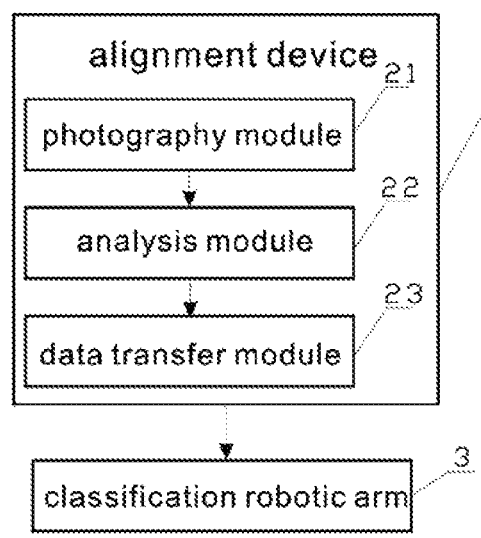
FIG. 2 is a system context diagram of an alignment device of a panel sorting device according to an embodiment of the disclosure.

Further, as shown in FIG. 2, the alignment device 2 comprises a photography module 21, an analysis module 22, and a data transfer module 23. The photography module 21 is configured to photograph the panels on the production line in position. The analysis module 22 is configured to analyze the data based on the data taken by the photography module 21, and to obtain the positional deviation of the panel. The data transfer module 23 is configured to transfer the data analyzed by the analysis module to the classification robotic arm 3. The photography module 21, the analysis module 22, and the data transfer module 23 are coupled in sequence. The photography module 21 can be a charge coupled device (CCD).

Further, the classification robotic arm 3 is configured to grab the panel and automatically correct the panel position based on the information of the positional deviation concerning front, back, left, and right directions of the panel acquired by the alignment device 2. And then, the classification robotic arm 3 places the panel in accordance with its sequence and specification to the corresponding position in the layer of the placement rack 1.

Specifically, the alignment device 2 and the classification robotic arm 3 are installed on the classification frame T, the classification structure is connected with the production line respectively. The classification frame T is a frame structure, and the alignment device is connected to the classification arm.

Specifically, the placement rack 1 is connected to the classification frame T. By this way, the efficiency and speed of transfer can be improved.

Further, the panel sorting device further comprises a transfer robotic arm 4, the transfer robotic arm 4 is configured to remove the panel according to a predetermined sequence and position from a layer in the placement rack 1 to a corresponding position in a cassette 5. The transfer robotic arm 4 repeatedly removes the panel according to the predetermined sequence and position in specification to the corresponding layer of the placement rack 1 to the corresponding position in the cassette 5.

In an embodiment, the transfer robotic arm 4 and the cassette 5 comprise frame structures, and can be moved individually. The transfer robotic arm 4 is disposed between the cassette 5 and the placement rack 1. In this way, the present invention can reduce the handling distance and enhance the handling efficiency.

Wherein, the transfer robotic arm 4 removing the panel in accordance with the sequence to the corresponding position in the layer of the placement rack to the corresponding position in the cassette 5 refers to the following.

The placement rack 1 uses the storage positions of the panels in different columns on the upper and lower layers to distinguish these panels of different specifications, and the cassette 5 also utilizes different layers to distinguish and store panels of different specifications. Therefore, the transfer robotic arm 4 can remove the panel in accordance with the sequence to the corresponding position in the layer of the placement rack to the corresponding position in the cassette 5. In this way, the panel sorting device can quickly classify these panels.

The panel sorting device according to the embodiment of the present invention is implemented as following. The photography module 21 of the alignment device 2 photographs the position and the visual of the panels on the production line. The analysis module 22 analyzes the data based on the data taken by the photography module 21, and to obtain the positional deviation of the panel. The data transfer module 23 transfers the data analyzed by the analysis module 22 to the classification robotic arm 3. The classification robotic arm 3 grabs the panel and automatic corrects the panel position, and then places the panel in accordance with its specification to the corresponding position in the layer of the placement rack 1. Wherein, each row of each layer of the placement rack 1 is corresponding to one kind of the panel's specification. Consequently, the transfer robotic arm 4 can remove the panel in accordance with its sequence and specification to the corresponding position in the layer from the placement rack 1 to the corresponding position in the cassette 5. Therefore, it is possible to quickly classify these panels.

The implementation of the panel sorting device provided by the invention has the following beneficial effects:

Firstly, the classification robotic arm corrects the panel position based on the information of the positional deviation acquired by the alignment device, and places the panel in accordance with its sequence and specification to the corresponding position in the layer of the placement rack. Therefore, the panel sorting device can quickly grab the panel and automatically sort according to the product's specifications. Furthermore, eliminate the danger during human handling and sorting process.

Secondly, the transfer robotic arm can remove the panel in accordance with its sequence and specification to the corresponding position in the layer of the placement rack to the corresponding position in a cassette. Therefore, the efficiency of automated handling and the yield of the product can be further improved.

Thirdly, its structure is achievable, able to increase the demand for automated handling. And can be easily repaired and maintained. Further, it can reduce costs, also enables space saving.

What is claimed is:

1. A panel sorting device, configured for sorting and transferring panels, comprising:
    a placement rack, comprising multiple layers, in each layer at least one panel is placed according to a panel specification and predetermined sequence and position;
    an alignment device configured to obtain a positional deviation of the panel moved on a production line;
    a classification robotic arm configured to correct the panel position in the placement rack based on the positional deviation acquired by the alignment device, and place the panel in the corresponding layer of the placement rack according to the panel specification and predetermined sequence and position; and
    causing the classification robotic arm to correct the panel position in the placement rack based on the positional deviation acquired by the alignment device, and place the panel in the corresponding layer of the placement rack according to the panel specification, and predetermined sequence and position
    wherein the panel sorting device further comprises a transfer robotic arm configured to remove the panel according to the predetermined sequence and position from a layer in the placement rack to a corresponding position in a cassette; and
    wherein the transfer robotic arm repeatedly removes the panel according to the predetermined sequence and position in the corresponding layer of the placement rack to the corresponding position in the cassette.

2. The panel sorting device according to claim 1, wherein the alignment device comprises:
    a photography module configured to photograph the panels on the production line in position;
    an analysis module configured to analyze the data based on the data taken by the photography module, and obtain the positional deviation of the panel;
    a data transfer module configured to transfer the data analyzed by the analysis module to the classification robotic arm;
    wherein the photography module, the analysis module, and the data transfer module are coupled in sequence.

3. The panel sorting device according to claim 1, wherein the alignment device and the classification robotic arm are respectively set on a classification frame connected to the production line, the classification frame is a frame structure, and the alignment device is connected to the classification robotic arm.

4. The panel sorting device according to claim 3, wherein the placement rack is connected to the classification frame.

5. The panel sorting device according to claim 3, wherein the transfer robotic arm and the cassette comprises frame structures, and the transfer robotic arm and the cassette can be moved individually.

6. The panel sorting device according to claim 5, wherein the transfer robotic arm is disposed between the cassette and the placement rack.

7. The panel sorting device according to claim 1, wherein the alignment device and the classification robotic arm are installed on the classification frame, the classification frame is connected with the production line, the classification frame is a frame structure, and the alignment device is connected to the classification robotic arm.

8. The panel sorting device according to claim 7, wherein the placement rack is connected to the classification frame.

9. The panel sorting device according to claim 7, wherein the transfer robotic arm and the cassette comprise frame structures, and the transfer robotic arm and the cassette can be moved individually.

10. The panel sorting device according to claim 9, wherein the transfer robotic arm is disposed between the cassette and the placement rack.

11. A panel sorting device, configured for sorting and transferring panels, comprising:
    a placement rack having multiple layers, and placing in each layer of the placement rack, at least one panel according to a panel specification and predetermined sequence and position;
    an alignment device configured to obtain the positional deviation of the panel moved on a production line; and
    a classification robotic arm configured to correct the panel position in the placement rack based on the positional deviation acquired by the alignment device, and place the panel in the layer of the placement rack, according to the panel specification and predetermined sequence and corresponding position; and
    causing the classification robotic arm to correct the panel position in the placement rack based on the positional deviation acquired by the alignment device, and place the panel in the corresponding layer of the placement rack according to the panel specification and predetermined sequence and position;
    the panel sorting device further comprises a transfer robotic arm configured to remove the panel from the placement rack according to a predetermined sequence and position in the corresponding layer in the placement rack to a corresponding position in a cassette;
    the transfer robotic arm repeatedly removes the panel from the placement rack according to a predetermined sequence and position in the corresponding layer in the placement rack to the corresponding position in the cassette;
    the alignment device further comprises:
    a photography module configured to photograph the panels on the production line in position;
    an analysis module configured to analyze the data based on the data taken by the photography module, and to obtain the positional deviation of the panel in the production line;

a data transfer module configured to transfer the data analyzed by the analysis module to the classification robotic arm;

wherein the photography module, the analysis module, and the data transfer module are coupled in sequence.

12. The panel sorting device according to claim 11, wherein the alignment device and the classification robotic arm are respectively set on a classification frame connected to the production line, the classification frame is a frame structure, and the alignment device is connected to the classification robotic arm.

13. The panel sorting device according to claim 12, wherein the placement rack is connected to the classification frame.

14. The panel sorting device according to claim 12, wherein the transfer robotic arm and the cassette comprise frame structures, and the transfer robotic arm and the cassette can be moved individually.

15. The panel sorting device according to claim 14, wherein the transfer robotic arm is disposed between the cassette and the placement rack.

* * * * *